US007546120B1

(12) United States Patent
Ulvenes

(10) Patent No.: US 7,546,120 B1
(45) Date of Patent: Jun. 9, 2009

(54) METHOD AND SYSTEM FOR MANAGING TRANSMISSION OF MEDIA TO MULTIPLE SUBSCRIBERS

(75) Inventor: Randy S. Ulvenes, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 484 days.

(21) Appl. No.: 11/250,670

(22) Filed: Oct. 14, 2005

(51) Int. Cl.
*H04M 3/42* (2006.01)
*H04W 4/00* (2009.01)
*H04B 1/10* (2006.01)

(52) U.S. Cl. ............... 455/422.1; 455/412.2; 455/3.02; 455/466

(58) Field of Classification Search ............ 455/422.1, 455/3.02, 412.2, 466
See application file for complete search history.

(56) References Cited

U.S. PATENT DOCUMENTS

| 5,613,194 | A | * | 3/1997 | Olds et al. ................. 455/429 |
| 5,724,345 | A | * | 3/1998 | Guarneri et al. ............ 370/316 |
| 5,982,778 | A | * | 11/1999 | Mangin et al. .............. 370/445 |
| 6,148,010 | A | | 11/2000 | Sutton et al. |
| 6,240,287 | B1 | | 5/2001 | Cheng et al. |
| 6,438,374 | B1 | | 8/2002 | Bhat |
| 6,665,521 | B1 | * | 12/2003 | Gorday et al. ........... 455/67.11 |
| 6,829,473 | B2 | | 12/2004 | Raman et al. |
| 6,898,423 | B2 | | 5/2005 | Motegi |

| 2003/0003921 | A1 | | 1/2003 | Laakso |
| 2003/0012149 | A1 | * | 1/2003 | Maggenti et al. ............ 370/260 |
| 2003/0040300 | A1 | * | 2/2003 | Bodic et al. ................. 455/412 |
| 2003/0217122 | A1 | | 11/2003 | Roese |
| 2006/0059096 | A1 | | 3/2006 | Dublish |

FOREIGN PATENT DOCUMENTS

WO  WO 2005076657 A1 * 8/2005

OTHER PUBLICATIONS

U.S. Appl. No. 10/349,592, filed Jan. 23, 2003 entitled "Method and System for Conserving Air Interface Traffic Channels in a Cellular Service Area".
Office Action from U.S. Appl. No. 10/349,592, dated Mar. 13, 2006.
SimplewireTM Wireless Message Protocol Server Product Sheet, http://www.simplewire.com/downloads/files/sw-doc-ps-wmp-server.pdf, printed from the World Wide Web on Jan. 23, 2003.

* cited by examiner

*Primary Examiner*—Vincent P Harper
*Assistant Examiner*—Marisol Figueroa

(57) ABSTRACT

Disclosed herein is a method and system for managing transmission of media to a plurality of subscribers. As a general matter, a media management system determines that a more than a threshold number of subscribers scheduled to receive a given media transmission are located within a common zone (e.g., common wireless coverage area, common geographically-defined area, etc.), and the system responsively (i) divides the subscribers in the common zone into two or more groups and (ii) transmits the media to the groups sequentially. Preferably, the system waits a period of time between transmission to each group.

16 Claims, 3 Drawing Sheets

METHOD AND SYSTEM FOR MANAGING TRANSMISSION OF MEDIA TO MULTIPLE SUBSCRIBERS

BACKGROUND

1. Field of the Invention

The present invention relates to wireless network communications and, more particularly to transmission of media to multiple subscribers in a wireless communications network.

2. Description of Related Art

The art and popularity of wireless communication devices has grown significantly over recent years. Indeed, millions of people are engaging in voice and data communications over wireless communication devices such as cellular telephones and Personal Digital Assistants (PDAs). In principle, a user can communicate over the Internet or call anyone over the Public Switched Telephone Network (PSTN) from any place inside the coverage area of a cellular wireless network.

In a typical cellular wireless network, an area is divided geographically into a number of cells and cell sectors, each defined by a radio frequency (RF) radiation pattern from a respective base transceiver station (BTS) antenna. The base station antennae in the cells are in turn coupled to a base station controller (BSC), which is then coupled to a telecommunications switch or gateway, such as a mobile switching center (MSC) or packet data serving node (PDSN) for instance. The switch or gateway may then be coupled with a transport network, such as the PSTN or a packet-switched network (e.g., the Internet). Conveniently with this arrangement, when a wireless communication device is positioned within a given sector, the device can communicate with entities on the transport network via a communication path comprising the BTS, the BSC, the switch or gateway, and the transport network.

Generally, each sector or other coverage area in a wireless communication system will have a limited extent of radio frequency resources. In a traditional CDMA system, for instance, the air interface for transmissions from a BTS to served devices is divided into a limited number of channels, each defined by a respective "Walsh code." Thus, each wireless coverage area can support only a finite extent of communications traffic at once.

This limitation can be particular problematic in the context of wireless packet-data communications. In a typical cellular wireless communication system, for instance, when a wireless communication device is to engage in packet-data communications, the device will enter into an "active" state by acquiring (i) a reserved air interface traffic channel, (ii) a data link with a network gateway, and (iii) an IP address for engaging in IP-based communications. After the device finishes sending and receiving packet data, however, the device's reserved air interface traffic channel will typically remain reserved for a period of time known as the "active-to-dormant" time period, so as to enable the device to engage in further packet-data communications. As a result of this active-to-dormant time period, air interface resources may be tied up even for devices that are not currently engaging in packet-data communications, thus further limiting the resources available for use by other devices.

SUMMARY

The present invention stems from a realization that, at times, it will be desirable to transmit media from a content server to wireless communication devices operating in various cellular wireless coverage areas. For example, wireless communication subscribers may sign up to have video, audio, text, or graphics news reports transmitted to their wireless communication devices when news occurs. When a network server has a news report to deliver, the network server may thus consult a subscriber database to determine which subscribers (i.e., which wireless communication devices) are to receive the news report, and the network server may then transmit the news report to each subscriber.

In all likelihood in such a process, many groups of the recipient subscribers will be located in common wireless coverage areas, such as common cell sectors. Consequently, when the network server transmits the media to the recipient subscribers, it is possible that the air interface resources in those wireless coverage areas will be consumed by the media transmission, leaving little or no resources for use by other subscribers in each such coverage area. Unfortunately as a result, certain wireless communications in the coverage areas can be delayed or, worse, altogether blocked.

Disclosed herein is a method and system for managing transmission of media to a plurality of subscribers, in an effort to help overcome this problem. As a general matter, according to an exemplary method, media transmission is managed by (i) determining that more than a threshold number of subscribers scheduled to receive a given media transmission are located within a common zone, and (ii) responsively dividing the subscribers in the common zone into two or more subscriber groups, and transmitting the media to the subscriber groups sequentially, preferably waiting a period of time between transmission to each group.

In a exemplary embodiment, the invention is carried out in a cellular wireless communications system. Therefore, a zone may be a cell or sector of such a system, or a combination of one or more cells or sectors, whether or not contiguous. Alternatively, the zone could be some other designated location or area (or combination of locations or areas) such as one or more buildings or campuses defined by geographic coordinates for instance. A zone can be defined in other ways as well.

According to the exemplary embodiment, when a computer system is to transmit media to a plurality of wireless communication subscribers, the computer system will determine the location of each subscriber and, by reference to zone-definition data, will determine that at least a threshold number of the subscribers are located within a common zone. In response, the computer system will then divide the subscribers in the common zone into two or more groups and will define a sequence of the groups. In accordance with the sequence, the computer system will then transmit the media one group at a time, waiting a defined period of time between each group transmission. In particular, the computer system will transmit the media to the subscribers in a first group of the sequence, wait a period of time, then transmit the media to the subscribers in a next group of the sequence, wait a period of time, and so forth, until the computer system has transmitted the media to all of the target subscribers in the common zone.

In one aspect, the exemplary embodiment may thus take the form of a method carried out by a computer system such as a media server for instance. The method may include (a) making a determination that at least a threshold number of the subscribers are located in a common zone, and (b) responsive to the determination, (i) dividing the subscribers in the common zone into two or more groups, (ii) creating a sequence of the groups, and (iii) transmitting the media to the groups in accordance with the sequence. Further, the method preferably involves waiting a period of time between transmitting the media to each group of the sequence, where the period of time is either static or dynamically set based on factors such as the expected speed at which the media will be transmitted to the subscribers, and the active-to-dormant time period that is used in the zone at issue.

Further, in another aspect, the exemplary embodiment may take the form of a system for managing transmission of media to a plurality of subscribers. Such a system may include, for instance, a processor, data storage, and program instructions stored in the data storage and executable by the processor (a) to make a determination that at least a threshold number of the subscribers are located in a common zone, and (b) in response to the determination, (i) to divide the subscribers in the common zone into two or more groups, (ii) to create a sequence of the groups, and (iii) to transmit the media to the groups in accordance with the sequence. Additionally, the program instructions are preferably executable by the processor to wait a period of time between transmission of the media to each group of the sequence.

Advantageously, by transmitting media to one group of subscribers at a time within the common zone, and preferably while waiting a period of time between transmitting to each group, it is believed that the invention will help avoid consuming too much of the valuable communication resources in the common zone. For instance, if the zone is a cell sector with a limited number of forward link traffic channels, the invention can help to avoid tying up all of the air interface channels at once solely for transmission of a given set of media to multiple subscribers in the sector. Rather, with the benefit of the invention, just some of the channels could be used at a time for transmission to each sequential group of subscribers.

These as well as other aspects, advantages, and alternatives will become apparent to those of ordinary skill in the art by reading the following detailed description, with reference where appropriate to the accompanying drawings. Further, it should be understood that the foregoing summary and the description provided below are set forth for purposes of example only and that many variations are possible, within the scope of the claims.

DETAILED DESCRIPTION

Figure 1:
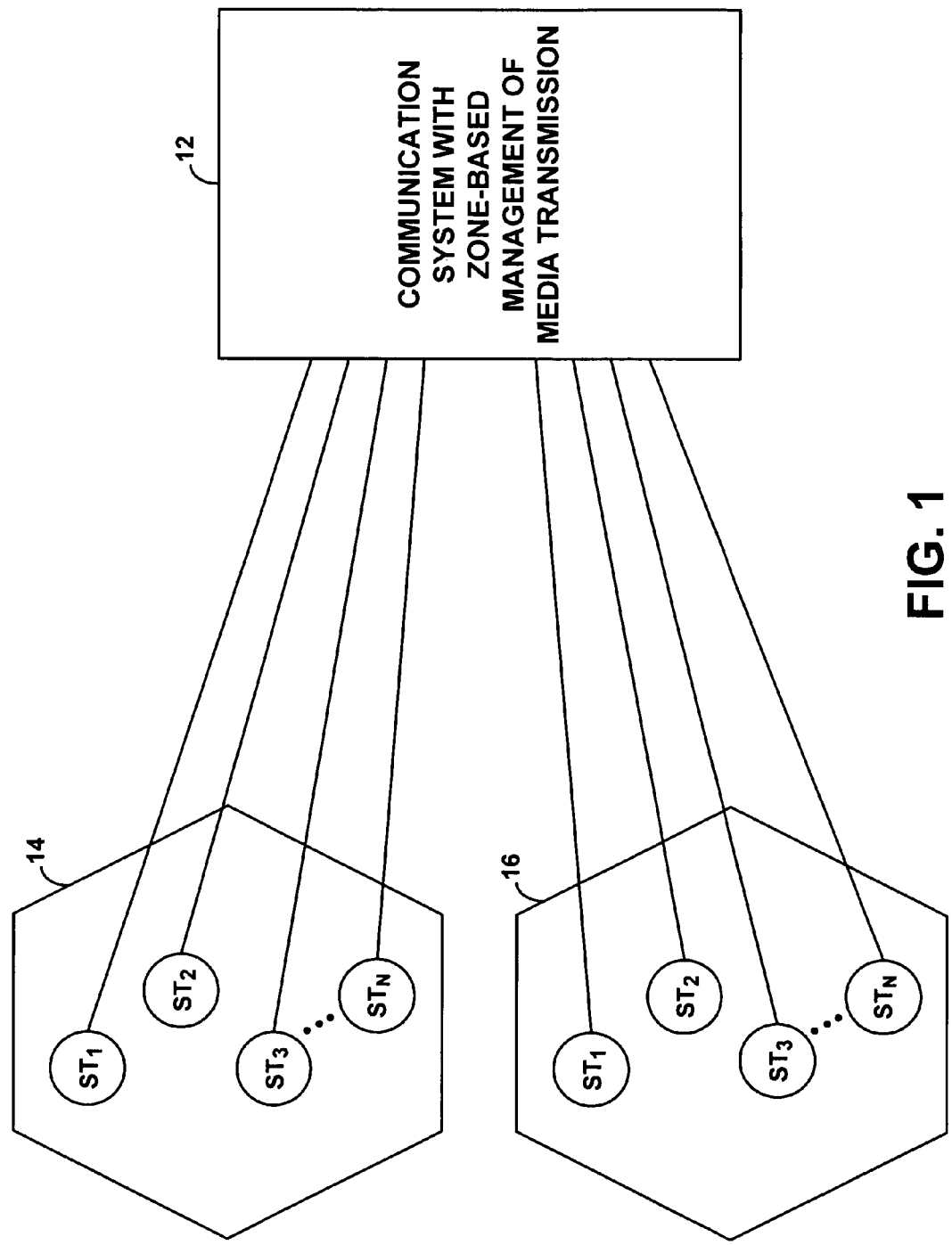
FIG. 1 is a simplified block diagram of a communication network in which the exemplary embodiment can be implemented.

Referring to the drawings, FIG. 1 is a block diagram generally depicting a communication network 10 in which an exemplary embodiment of the invention can be implemented. As shown, network 10 includes a communication system 12, which functions generally to manage transmission of media. As further shown, the network 10 includes a plurality of zones, and in each zone a plurality of mobile subscriber terminals each adapted to receive the media transmission from communication system 12. For illustrative purposes, two exemplary zones 14, 16 are shown. Zone 14 is shown including, possibly among others, N subscriber terminals. And zone 16 is shown including, possibly among others, M subscriber terminals.

Although zones 14, 16 are shown as discrete (non-overlapping) areas, the zones could just as well overlap each other or, for that matter, be physically coterminous. As a general matter, each zone can be defined in various ways. For example, a zone could be a particular geographic area, defined as a polygon comprised of nodes having specific geographic coordinates (latitude/longitude coordinates). As another example, a zone could be a particular enclosure such as a building or floor of a building, defined by the walls of the enclosure. And as yet another example, a zone could be a wireless coverage area in a wireless communication system, such a radio-frequency cell or sector thereof, defined by a radiation pattern from a base station antenna, or a BSC or PDSN serving area for instance.

The subscriber terminals shown operating in zones 14, 16 can also take any of a variety of forms and can be the same as each other or different than each other. Examples of suitable terminals include cellular or PCS telephones, PC cards or data terminals (e.g., wireless web devices such as the PALMONE TREO or the RIM BLACKBERRY personal digital assistants), wireless local area network stations (e.g., stations that are compliant with industry standard 802.11), and satellite communication terminals. Other examples are possible as well.

The links shown extending between each of the subscriber terminals and the communication system 12 can similarly take any of a variety of forms and can also be the same as or different than each other. Further, each link could comprise various elements, such as wired or wireless connections, direct end-to-end connections, and one or more transport networks, whether packet-switched or circuit-switched, and each link could operate according to any of a variety of protocols. Additionally, some or all of the links could be combined together at least in part. For instance, some of the links might be physically connected through a common access network/gateway and via a common transport network to communication system 12. Many other examples are also possible.

Communication system 12, in turn, can also take a variety of forms. As a general matter, as noted above, communication system 12 functions to manage transmission of media to subscribers. As such, communication system 12 can be the originator of a media transmission (e.g., a content server), or communication system 12 can be an intermediary that sits between a media transmission entity (e.g., content server) and the destination subscriber terminals.

Figure 2:
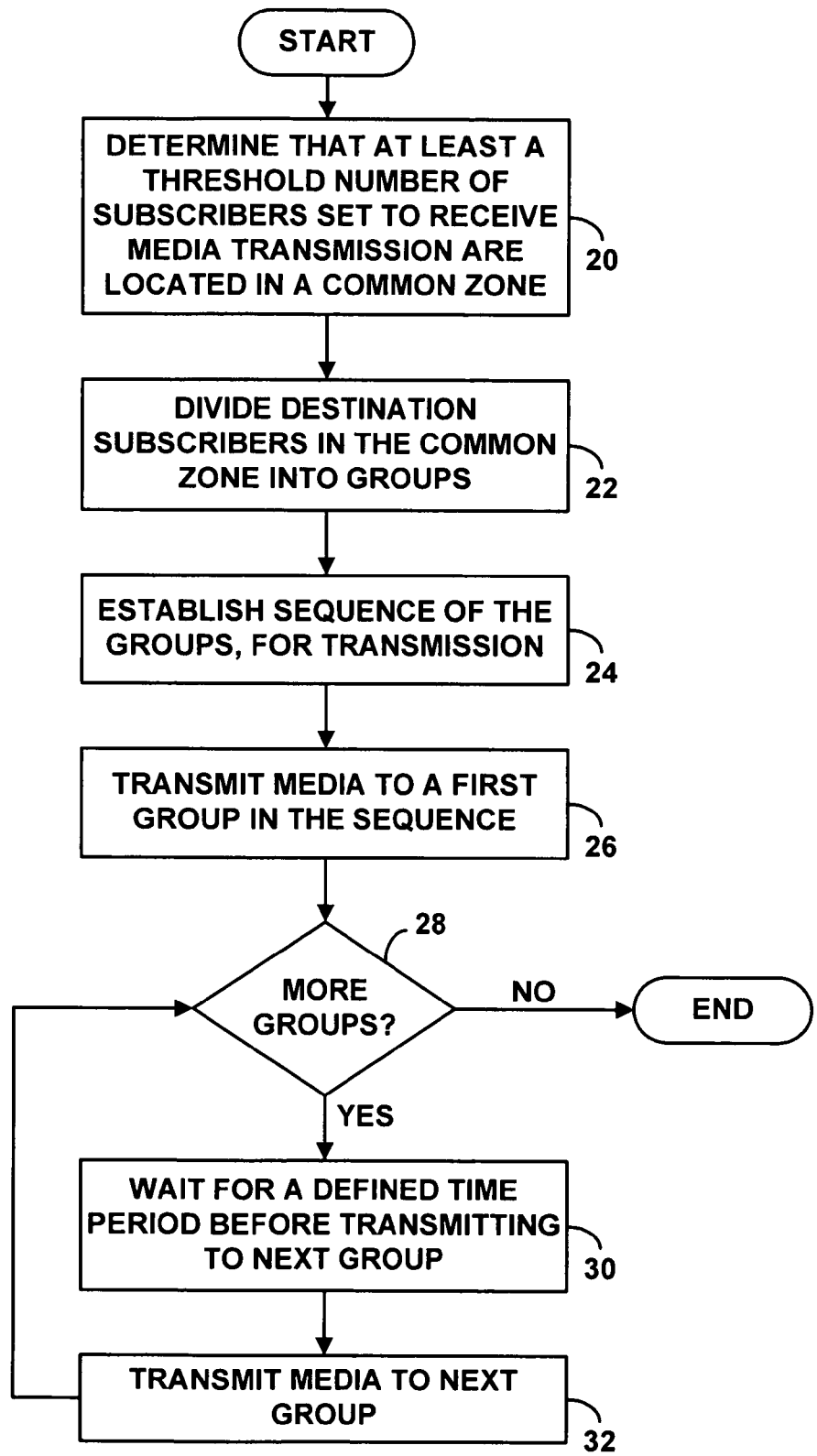
FIG. 2 is a flow chart depicting functions carried out in accordance with the exemplary embodiment.

FIG. 2 is a flow chart generally depicting functions carried out by communication system 12 in accordance with an exemplary embodiment of the invention. FIG. 2 begins with the assumption that communication system 12 is faced with a need to transmit media to a plurality of subscribers. By way of example, each of the plurality of subscribers may have signed up to receive a certain type of media transmission, such as news updates for instance, and such a transmission may be ready for transmission to those subscribers.

As shown in FIG. 2, at step 20, communication system 12 first determines that at least a threshold number of the subscribers who are set to receive the media transmission are located (e.g., operating) within a common zone.

To do so, the communication system may determine for each subscriber (i) the subscriber's location, and (ii) a zone in which the subscriber's location falls. To determine the subscriber's location, the communication system may query a location-determination system, such as a mobile positioning center (MPC) or home location register (HLR) for instance, either of which may provide a read on the subscriber's last known location (e.g., geographic location coordinates, or last cell sector in which the subscriber registered). To determine the zone in which the location falls, the communication system may then consult a predefined set of zone data that defines zone boundaries. On the other hand, if the determined location itself is a zone, then the communication system may conclude based on that indication alone that the subscriber is located in the zone indicated.

The communication system may then tabulate the number of destination subscribers per zone and may compare the tabulated number per zone to a threshold number for the zone. In this regard, the threshold number per zone can be indicated by zone data as well or could be set generally to apply for all zones. In the exemplary embodiment, media transmissions may be made at off-peak hours, generally early in the morning when traffic levels are not as much of a concern. Consequently, the threshold may or may not account for network congestion. However, in other embodiments current, historic, and/or projected network congestion, as well as other factors, may be considered when determining what threshold to apply.

In any event, the communication system may thereby determine that for at least a given one of the zones, the number of destination subscribers in the zone equals or exceeds the threshold number for the zone. Through this process, for instance, the communication system 12 may determine that zone 14 contains N of the destination subscribers, that the threshold for zone 14 is N−1, and thus, that at least the threshold number of destination subscribers are located in common zone 14.

At step 22, in response to the determination that at least a threshold number of the destination subscribers are located within a common zone, the communication system will next divide the number of destination subscribers in that zone into groups of subscribers, to facilitate groupwise transmission of the media to the subscribers in the zone. To do this, the communication system may simply divide the number of destination subscribers in the zone by a designated number, so as to establish groups each containing the designated number of subscribers, plus perhaps one group with a remaining number of subscribers.

In a preferred embodiment, the destination subscribers can be divided into groups that are each no larger than the size of the threshold. For instance, if the threshold for the zone is 8 subscribers, and a total of 17 destination subscribers are located in the zone, the communication system can divide the destination subscribers into three groups of 8, 8, and (the remainder) 1. As another example, if the threshold for the zone is 8 subscribers, and a total of 10 destination subscribers are located in the zone, the communication system can divide the destination subscribers into two groups of 8 and (the remainder) 2 subscribers. Using the threshold as the group size makes sense, as it accounts for the established limit on simultaneous media transmissions in the zone.

The number of subscribers per group is a matter of design choice, understanding in balance that if the groups are smaller, the total time to transmit to all of the destination subscribers in the zone may be higher, while if the groups are larger, more resources in the zone will be consumed at once for transmission to each group. Further, the groups could have different numbers of subscribers if desired, or if not evenly divisible.

At step 24, the communication system 12 next establishes a sequence of the groups in the common zone, i.e., an order in which the communication system will transmit the media to the groups of subscribers in the zone. In one embodiment, the communication system may establish this sequence substantially randomly, i.e., taking into account no significant ordering factors. In another embodiment, however, the communication system may establish these sequence, and indeed the groups themselves, based on subscriber priority or based on one or more other factors. For instance, subscribers who pay more for service may have a higher service level and may be grouped in a higher priority group than other subscribers. The communication system may then be set to transmit to the higher priority groups before transmitting to the other groups, so that the subscribers with higher service level will receive the media transmission before other subscribers.

At steps 26-32, the communication system next transmits the media to each group, pausing a defined period of time between transmission to each group. The communication system may transmit the media to each group by multicast transmission to the subscribers in the group or by unicast transmission to each subscriber in the group. Unicast transmission, for instance, may involve transmitting the media via the well known Multicast Messaging System (MMS) to each subscriber (which would involve sending a trigger message to each subscriber, to cause the subscriber to send an HTTP request for the media), or could take other forms. Transmission of the media to the subscribers in a given group can occur simultaneously or in quick series (largely simultaneously).

The amount of time that the communication system waits between transmission of the media to one group of subscribers and transmission of the media to a next group of subscribers can be set dynamically based on various factors. In a preferred embodiment, for instance, the communication system may set the amount of time to be sufficient to allow for at least completion of the media delivery to the first group. In this regard, the communication system can programmatically take into account the size of the media to be delivered and a maximum speed at which data can flow to the various subscribers in the zone, so as to compute a minimum amount of time that the system should wait for completion of the transmission to a given group.

By way of example, if the zone is a cell sector that operates according to an air interface protocol in which multiple subscribers can simultaneously (e.g., on separate channels) receive data transmissions at a minimum of R kilobytes per second apiece (e.g., CDMA 1xRTT), and if the media to be transmitted is S kilobytes, then the communication system may compute that the minimum transmission time is $R \times S = T$ seconds. As another example, if the zone is a cell sector that operates according to an air interface protocol in which data transmission to each subscriber uses all available transmission bandwidth in the sector (e.g., CDMA 1xEV-DO), and if the minimum transmission speed in the sector is Q kilobytes per second, the media is size S, and there are P subscribers in the group, then the communication system may compute that the minimum transmission time is $Q \times S \times P = T$ seconds. This same sort of analysis can be applied for zones that are not cell sectors, taking into consideration instead the transmission speed limitations of the cell sectors that encompass the zones for instance.

As an enhancement of this process, the communication system may also take into consideration the active-to-dormant time period that would be applied for data communications in the zone at issue. In particular, recognizing that air interface resources may remain reserved for the duration of the active-to-dormant time period following transmission of media to a given subscriber, the communication system may programmatically add to the computed minimum transmission period for the group the active-to-dormant time period applicable in the zone at issue. Typically, a common active-to-dormant time period would be in place for all zones, and so known active-to-dormant time period can be used. In the event different active-to-dormant time periods are in place for various areas (e.g., various cell sectors or other zones), however, the communication system may use the maximum active-to-dormant time period applicable within the zone at issue.

Still further, in the exemplary embodiment, the communication system can programmatically increase time that it waits between groups to be more certain that the wait time is sufficient to allow for completion of media delivery and perhaps for release of air interface resources reserved for the recipient subscribers. For instance, if the communication system computes a desired wait time of $Q \times S \times P=T$, the communication system can further double that wait time to 2T, to be safe.

In the exemplary embodiment, the communication system 12 may apply the process of FIG. 2 with respect to each of a plurality of zones. For example, the communication system 12 may apply the process with respect to zone 14 and consequently transmit the media in a groupwise manner to the destination subscribers located in zone 14, and the communication system 12 may also apply the process with respect to zone 16 and consequently transmit the media in a groupwise manner to the destination subscribers located in zone 16.

Figure 3:
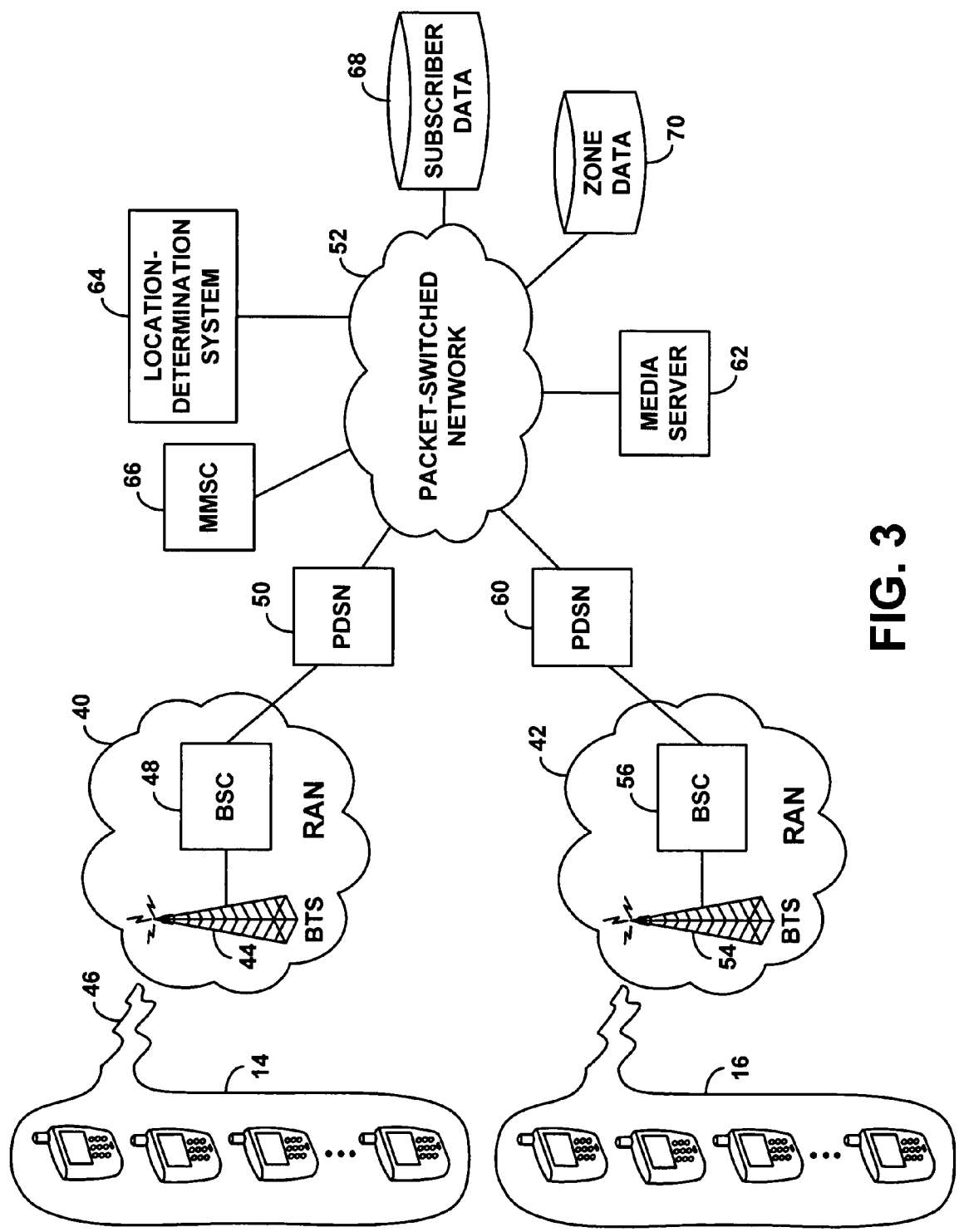
FIG. 3 is a more detailed block diagram depicting a communication network in which the exemplary embodiment can be implemented.

Referring next to FIG. 3, a more detailed block diagram is provided, to illustrate more specifically how an exemplary network arrangement in the invention can be implemented. It should be understood, of course, that this and other arrangements described herein are set forth for purposes of example only. As such, those skilled in the art will appreciate that other arrangements and other elements (e.g., machines, interfaces, functions, orders of functions, etc.) can be used instead, and some elements may be omitted altogether. Further, those skilled in the art will appreciate that many of the elements described herein are functional entities that may be implemented as discrete or distributed components or in conjunction with other components, and in any suitable combination and location.

In FIG. 3, the two exemplary zones 14, 16 of FIG. 1 are shown as respective wireless coverage areas, defined by radiation from base station antennas of radio access networks 40, 42. By way of example, each radio access network (RAN) takes the form described in the background section above. Namely, RAN 40 includes a BTS 44 that communicates with wireless subscriber terminals over an air interface 46, and a BSC 48 that controls the air interface communication between BTS 44 and the subscriber terminals. The BSC 48 is then coupled with a PDSN 50 that functions as a network access server, providing connectivity with a packet-switched network 52 such as the Internet and/or a private packet-data network. RAN 42 similarly includes a BTS 54 that communicates with wireless subscriber terminals over an air interface 56, and a BSC 58 that controls the air interface communication between BTS 54 and the subscriber terminals. BSC 58 is then coupled with a PDSN 60 that similarly provides connectivity with packet-switched network 52.

In an alternative embodiment, it should be understood that the two RANs 40, 42 illustrated in FIG. 3 can be combined in whole or in part. For instance, they can share a common BSC, and perhaps a common BTS. Further both RANs can share a common PDSN instead of separate PDSNs. Other variations are possible as well.

Shown sitting as nodes on packet-switched network 52 are a media server 62, a location-determination system 64, a multimedia messaging service center (MMSC) 66, a subscriber data store 68, and a zone data store 70. Each of these entities may sit as a discrete node on network 52 or may be accessible in some other manner through the network. Further, some of the entities can be combined together. For instance, rather than having the subscriber data store 68 and zone data store 70 be separate from the media server 62, the media server can contain those data stores. Other variations are possible as well.

Media server 62 is preferably a computer server that is equipped to carry out the logical functions of the exemplary embodiment. As such, media server 62 may include a processor (i.e., one or more general purpose and/or special purpose computer processors), and data storage (e.g., volatile and/or nonvolatile) containing program instructions executable by the processor to carry out the functions described herein. Media server 62 also preferably includes a network communication interface, such as an Ethernet network interface card for instance, for coupling with network and through which media server 62 communicates with the various other entities shown.

Location-determination system 64 comprises any system now known or later developed that is equipped to report the current or last known location of a designated wireless subscriber terminal. By way of example, location-determination system 64 may comprise or have access to an IS-41 home location register (HLR), which conventionally maintains a record of the cell and perhaps cell sector in which each wireless subscriber terminal most recently registered. As another example, location-determination system 64 may comprise or have access to a J-STD-036 mobile positioning center (MPC), which functions conventionally to receive a request for a subscriber terminal's location and to responsively ascertain and report the location. An MPC may determine a subscriber terminal's location, for instance, by signaling (typically via an SS7 network (not shown)) to the RAN serving the subscriber terminal and/or by obtaining a GPS reading from the subscriber terminal itself.

MMSC 66 preferably functions to facilitate delivery of media content from an MMS sender to an MMS recipient. In typical practice, an MMS sender will send media content in a specially formatted MMS message to the MMSC 66, and the MMSC 66 will then store the media content and send a notification message (typically via short messaging service (SMS) to the MMS recipient, providing the recipient with a dynamically generated URL pointing to the stored media content. Upon receipt of the notification message, the MMS recipient will then acquire packet-data connectivity if it does not have connectivity already and will send an HTTP request seeking to download the media content from the provided URL.

Subscriber data store 68 may take the form of a database server or data file and preferably comprises subscriber service records indicating which subscribers are to receive particular media transmissions. Subscriber data store 68 may include individual subscriber profile records as well as rolled up data indicating which subscribers subscribe to the media transmission service at issue. Alternatively, subscriber data store 68 may simply include a listing of the destination subscribers at issue.

In a preferred embodiment, the subscriber data will include for each destination subscriber one or more subscriber-IDs or other data sufficient to allow a determination of the subscriber's location and sufficient to allow transmission of the media at issue to the subscriber. Example subscriber-IDs or other data include, without limitation, mobile identification number (MIN), mobile directory number (MDN), network access identifier (NAI), and IP address. The data in subscriber data store 68 can be established manually in advance and can be dynamically updated as subscriptions change.

The subscriber data may also indicate for each subscriber what air interface protocol the subscriber generally uses when engaging in wireless packet-data communication (e.g., which air interface protocol the subscriber terminal is equipped to use, or the slowest if it is capable of using multiple protocols). In one embodiment of the invention, the media server 62 can use this data as a basis to segregate the destination subscribers in a given zone based on their air interface protocols, and the media server 62 can then apply the invention separately for each air interface protocol. For example, given that CDMA 1xRTT subscribers will likely have slower data communication speeds than CDMA 1xEV-DO subscribers, the media server 62 can apply the process of FIG. 2 separately for these two types of subscribers, using different inter-group wait times per type of subscriber.

Zone data store 70 may take the form of a database server or data file and preferably comprises zone data records defining various zones in which subscriber terminals can be located. The zone definition can take various forms per zone, depending on the type of zone. For example, if the zone is a geographic area, the zone could be defined as a polygon with geographic coordinates as nodes. As another example, if the zone is a cell sector, the zone could be defined by cell sector ID. Other examples are possible as well.

In a preferred embodiment, the zone data records also specify various operational parameters for each zone. To facilitate implementation of the exemplary embodiment, for instance, the zone data records preferably specify, per zone, (a) the threshold number of destination subscribers, (b) the minimum data rate of transmission typically used in the zone, (c) the air interface protocol typically used in the zone, and (d) the active-to-dormant time period typically used in the zone. The media server 62 can use the threshold number indicated for a particular zone as a basis to trigger groupwise transmission as described above. Further, the media server 62 can use the minimum data rate, the air interface protocol (having an associated minimum/typical data rate), and active-to-dormant time period, as a basis to determine an appropriate inter-group time period as described above.

An exemplary embodiment of the present invention has been described above. Those skilled in the art will understand, however, that changes and modifications may be made to this embodiment without departing from the true scope and spirit of the invention, which is defined by the claims.

What is claimed is:

1. A method for managing a transmission of media to a plurality of subscribers comprising:
    making a determination that at least a threshold number of the subscribers are located in a common zone; and
    responsive to the determination, (i) dividing the subscribers in the common zone into two or more groups, (ii) creating a sequence of the groups, and (iii) transmitting the media to the groups in accordance with the sequence, and (iv) waiting a period of time between transmitting the media to each pair of groups in the sequence, wherein the period of time is based on an active-to-dormant time period used within the common zone.

2. The method of claim 1, wherein transmitting the media to the groups in accordance with the sequence comprises:
    (a) transmitting the media to subscribers of a first group of the sequence;
    (b) waiting the period of time;
    (c) transmitting the media to the subscribers of a next group of the sequence; and
    (d) repeating steps (b) and (c) until finished transmitting the media to the subscribers in the common zone.

3. The method of claim 1, further comprising determining the period of time to wait based further on expected speed of transmission of the media to the subscribers.

4. The method of claim 1, wherein dividing the subscribers in the common zones into two or more groups comprises dividing the subscribers in the common zone into groups each no larger than the threshold number of subscribers.

5. The method of claim 1, wherein transmitting the media to the groups in accordance with the sequence comprises:
    (a) transmitting the media to subscribers of a first group of the sequence using Multimedia Media System (MMS) transmission;
    (b) transmitting the media to the subscribers of a next group of the sequence using Multimedia Media System (MMS) transmission; and
    (c) repeating step (b) until finished transmitting the media to the subscribers in the common zone.

6. The method of claim 1, further comprising applying the method separately for (i) subscribers operating under a first air interface protocol and (ii) subscribers operating under a second air interface protocol different than the first air interface protocol.

7. The method of claim 6, wherein the first air interface protocol is CDMA 1xRTT, and wherein the second air interface protocol is CDMA 1xEV-DO.

8. The method of claim 1, wherein the common zone comprises an area selected from the group consisting of a wireless coverage area and a geographically defined area.

9. The method of claim 1, wherein each of the subscribers comprises a wireless communication device.

10. The method of claim 1, wherein the media comprises at least one of audio, video, text, and graphics.

11. The method of claim 1, further comprising repeating the method respectively for each of a plurality of common zones.

12. The method of claim 1, wherein making a determination that at least the threshold number of the subscribers are located in the common zone comprises:
    for each subscriber of the plurality of subscribers, determining a location of the subscriber, and determining a zone in which the subscriber's location falls; and
    tabulating a count of subscribers per zone, and determining that the count for the common zone is at least the threshold.

13. The method of claim 12,
    wherein determining the location of the subscriber comprises querying a location-determination system; and
    wherein determining the zone into which the subscriber's location falls comprises querying zone data that defines a plurality of zones.

14. A system for managing transmission of media to a plurality of subscribers comprising:
    a processor;
    data storage; and
    program instructions stored in the data storage and executable by the processor (a) to make a determination that at least a threshold number of the subscribers are located in a common zone, and (b) in response to the determination, (i) to divide the subscribers in the common zone into two or more groups, (ii) to create a sequence of the groups, (iii) to transmit the media to the groups in accordance with the sequence, and (iv) to wait a period of time between transmitting the media to each pair of groups in accordance with the sequence, wherein the period of time is based on an active-to-dormant time period used within the common zone.

15. The system of claim 14, further comprising:
    a location-determination system for determining a location of each subscriber; and zone-data defining each a plurality of zones, including the common zone;

wherein the program instructions are executable to make the determination by (a) querying the location-determination system to determine a location of each subscriber, (b) consulting the zone-data to determine zones into which the subscribers' locations fall, (c) tabulating a count of subscribers per zone, and (d) determining that the count of subscribers located within the common zone equals or exceeds the threshold.

16. The system of claim 14, wherein the program instructions are executable to divide the subscribers in the common zone into groups each no larger than the threshold number of subscribers.

* * * * *